April 15, 1969     H. W. DUEPREE     3,438,164
UNIT CONSTRUCTION COMPONENT
Filed Jan. 5, 1967     Sheet 1 of 6
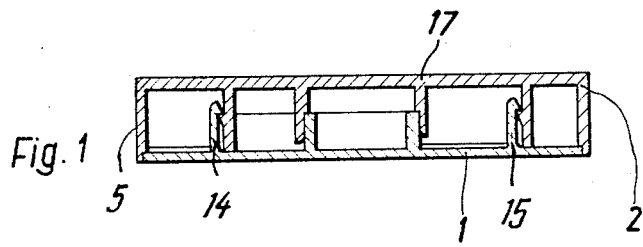
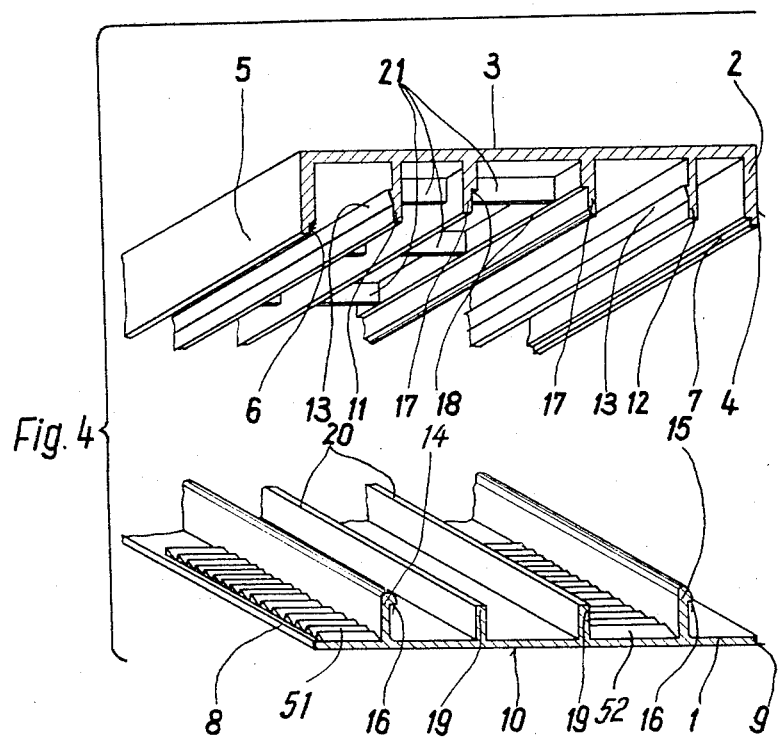
Inventor:
HANS WERNER DUEPREE
By
Attorney:

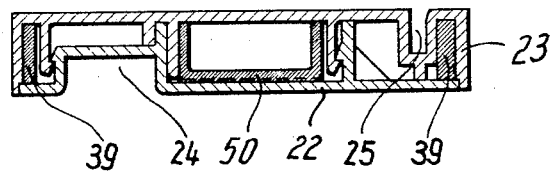
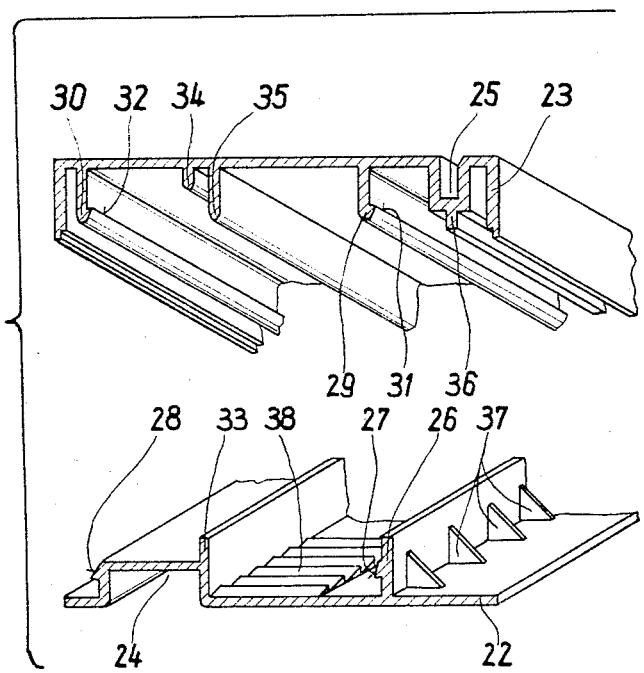

Inventor:
HANS WERNER DUEPREE
By
Attorney

April 15, 1969 H. W. DUEPREE 3,438,164
UNIT CONSTRUCTION COMPONENT
Filed Jan. 5, 1967

Inventor:
HANS WERNER DUEPREE
By
Gerard I. Weiser
Attorney.

April 15, 1969 H. W. DUEPREE 3,438,164
UNIT CONSTRUCTION COMPONENT
Filed Jan. 5, 1967 Sheet 5 of 6

Inventor:
HANS WERNER DUEPREE
By
Attorney:

United States Patent Office 3,438,164
Patented Apr. 15, 1969

3,438,164
UNIT CONSTRUCTION COMPONENT
Hans Werner Duepree, Avenwedde, Germany, assignor to Elco-Kunststoffe A. Elges & Co., Avenwedde, Germany, a company of Germany
Filed Jan. 5, 1967, Ser. No. 607,532
Claims priority, application Germany, Jan. 10, 1966, E 30,809
Int. Cl. A47b 47/04; E04c 3/28, 2/38
U.S. Cl. 52—282                    28 Claims

ABSTRACT OF THE DISCLOSURE

The present disclosure relates to unit construction components for use in assembly of structures such as boxes, drawers, shelves and other parts for furniture and the like. The components comprise a board member which consists of a U-shaped compartment portion and a cover portion. The two portions are designed to interlock by means of barbed strut members located on the inner surface of the compartment and cover portions, thus forming an open-ended board. The components also comprise connecting members having an upright member on which is formed at least one laterally extending pin member which has on it saw-toothed barbs which interlock with corresponding saw-toothed barbs on the inner surface of the cover portion of the board when the connecting member is inserted in the end of the board. The outer surface of the board may be provided with grooves to serve as drawer glides and shelf guides and supports. The boards and connecting members can be assembled in various combinations and stacks as desired to form the type of structure desired. The components can be made of injection-moulded plastic materials such as polyvinyl chloride. The connecting members are in the form of end caps, angle joints or T-joints.

Figure 3:
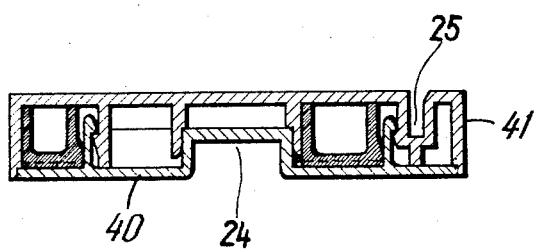

The present invention relates to unit construction components, particularly components for the easy assembly of boxes, drawers, shelves, and other parts for furniture and the like. Such unit construction components may be of a size such as to enable them to be used for the interior fittings of dwelling houses or as toys.

Frames made of plastic materials are already conventionally used for box-shaped furniture, drawers or the like and comprise a hollow section of substantially rectangular cross-section which is produced by a compression process with a moulded support for a floor or rear wall which may be inserted therein. These sections are connected together by means of angle brackets of wood, metal or plastic materials.

Considerable difficulty and expense is involved in the manufacture of sections of plastic materials when these are of a complicated design. Such sections cannot be produced with a high degree of precision and are restricted to particular shapes, it being impossible to produce shaped portions, reinforcements or the like which extend at right angles to the length of the section.

The invention seeks to obviate or minimize these disadvantages.

The invention consists in a unit construction component consisting of boards and connecting members, the boards being composed of two outwardly smooth-surfaced portions of injection-moulded material connected together by means of inwardly-extending barbed members between which are located longitudinally extending spaces, while the connecting members are either angle joints, linear, or end-cap joints or T-joints with pins which engage in the longitudinal spaces in the boards and are secured by means of saw-toothed barbs.

More specifically, the invention comprises a unit construction component comprising a multiplicity of boards and connecting members, each board comprising two outward facing planar-surfaced portions of injection-moulded material, each portion comprising at least one pair of laterally and longitudinally extending barbed members integral with longitudinal strut members integral with an inwardly facing surface opposite its outwardly facing surface, longitudinally extending spaces located between said strut members, laterally extending saw-toothed barb locking members integral with at least one portion and projecting into one of said spaces between at least one pair of strut members of said portion, each connecting member comprising an upright member having integral therewith and at an angle thereto at least one horizontally extending pin member having a multiplicity of saw-toothed barb members extending laterally from at least one surface of said pin member, which pin member engages in the longitudinal spaces between said struts of said board and the connecting member thereby being secured by interlocking said barb members on said pin member to said barb members on said inner surface of said portion of said board.

The boards are composed of a first, compartment, part which forms three longitudinal outer surfaces and a second cover, part mounted on the first part and forming a longitudinal outer surface. More specifically, each board comprises a first board part which forms three longitudinal outer surfaces substantially in the form of an inverted U having a top surface and two side surfaces and a second board part which extends from one side surface to the other side surface of the first board part and is parallel to said top surface, forming a fourth longitudinal surface and serving to cover said first board part.

Each board part may be provided with a longitudinal groove adjacent the edges and may also possess a guide groove on the wall opposite the first, insert groove. Transverse reinforcements are located on the barbed members on the inner portions of the boards. The longitudinal spaces contain reinforcements which are preferably in the form of U-shaped rails and are inserted or cut therein. The connecting parts can form the end walls of the boards and can be provided with the same outer channelled form. The boards may be provided on one of their outer longitudinal sides with transverse ribs which serve as supports for a pigeonhole arrangement.

Figure 6:
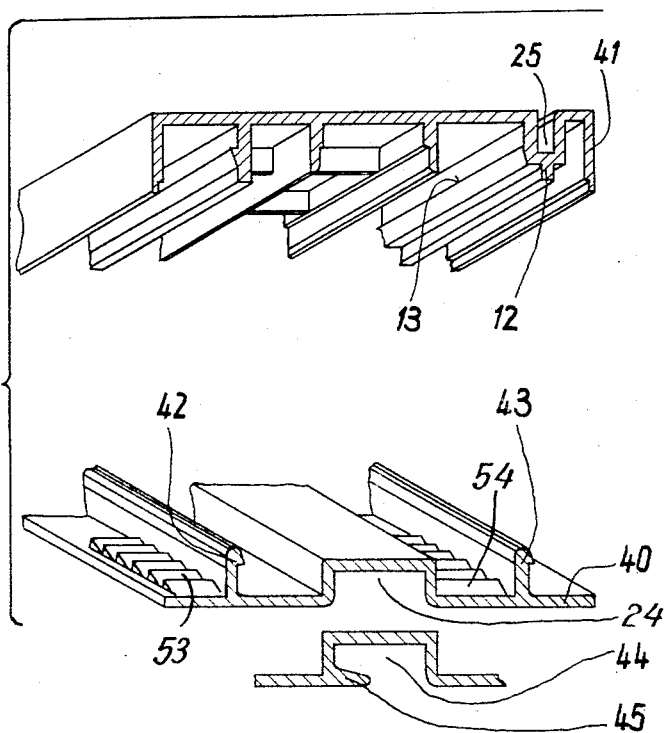

In order that the invention may be more clearly understood, reference will now be made to the accompanying drawings which show some embodiments thereof by way of example, and in which:

FIGURES 1 to 3 show cross sectional views through various embodiments of the boards, FIGURES 4 to 6 show perspective views of the parts shown in FIGURES 1 to 3 respectively, but in a dismantled state, and FIGURES 7 to 12 show perspective views of connecting members shown in various embodiments.

Referring now to the drawings, in FIGURES 1 and 4 the embodiment shown is of a board composed of two parts 1 and 2 produced by a simple injection moulding process. The part 2 forms three longitudinal outer surfaces of the board, viz., a broad longitudinal outer surface 3 and the two narrow longitudinal outer surfaces 4 and 5. Grooves 6 and 7 are formed at the ends of the narrow longitudinal outer surfaces 4 and 5 and receive the longitudinal edges 8 and 9 of the part 1 which constitutes the broad longitudinal outer surface 10 located opposite the broad longitudinal outer surface 3 of the part 2.

A number of longitudinal struts are arranged in the direction of the length of the parts 1 and 2, at least two of these struts being in the form of barbs. In the drawings, the struts 11 and 12 on the part 2 are in the form of barbs, each strut being provided with a laterally-projecting ledge 13 at approximately the mid-point of the height of the struts, said ledge being provided with a sloping, upwardly extending front surface and a surface approximately at right angles to the strut. Opposite these struts are struts 14 and 15 on part 1 which are provided with projecting lugs 16 at their outer ends. The lugs 16 have on their outer surface an upwardly inclined portion and on the inside a surface extending approximately at right angles to the strut. This surface at right angles to the strut abuts against the corresponding surface at right angles to the strut on the struts 11 and 12 when the two parts 1 and 2 are pressed together, so that the longitudinal edges 8 and 9 of the part 1 engage in the grooves 6 and 7 on the part 2. Two further longitudinally-extending struts 17 are located on the part 2 and are provided with projecting portions 18 about half-way up their height. The struts 19 on the part 1 are located opposite these struts 17 on the part 2 and when both parts are fitted together, the end edges 20 of the struts abut against the edges of the grooves 18 in the struts 17 of the part 2.

Reinforcement ribs 21 may be located between the various struts on the parts 1 and 2 at a distance from one another and extend at right angles to the length of the parts 1 and 2. In the embodiment shown in FIGURES 1 and 4, reinforcing ribs 21 are arranged between the struts 11 and 17 and the two struts 17 on the part 2. In addition, a first saw-toothed barbed portion 51 is located between the outer edge 8 and the strut 14 and a second saw-toothed barbed portion 52 is located between the strut 15 and the strut 19 on the part 1 and serves to produce a secure connection between this part and the connecting members described below.

The two end surfaces of the sections 1 and 2 may be covered by continuous walls which extend to mid-height so that when the sections are fitted together to form a board, the two end surfaces appear as smooth surfaces. These walls on the end surfaces are not shown in the figure for the sake of clarity but are preferably formed at least in the areas between the struts 15 and 19 and the edge 8 and strut 14 on the part 1 and the opposite surfaces on the part 2 within thin points of connection with the struts and walls so that these may easily be broken off when it is desired to attach a connecting member at this point. This design of the end surface and the shape of the reinforcing ribs 21 on the part 2 and corresponding reinforcing ribs on the part 1 which engage with the ribs 21 when both parts 1 and 2 are fitted together, make it impossible to separate the parts once they have been combined to form a board and the co-operating barbs on the struts have come into engagement. The two parts 1 and 2 which have thus been combined now form a compact, light-weight board with internal reinforcements which is extremely accurately shaped and may be combined with other such parts, by means of the connecting members described below, in a varied manner.

The embodiment shown in FIGURES 1 and 4 is a board component which has smooth surfaces on all sides. In the case of the embodiment shown in FIGURES 2 and 5 the board is composed of two separate parts 22 and 23, the part 22 having a broad groove 24 located adjacent one edge while the other part 23 is provided with a narrow groove 25 adjacent the opposite edge. A board component of this type may be used inter alia for the making of drawers and to form the side walls. The component then is pushed into the groove 25 in the base of the drawer and the groove 24 serves to guide and suspend the drawer in a guide strip.

In this case too, a series of longitudinal struts is arranged in the parts 22 and 23. In the case of the part 22 a longitudinal strut 26 carries a barbed lug 27 at mid-height. A further barbed lug 28 is located mid-way up the inner side of the wall of the groove 24. Struts 29 and 30 on the part 23 are located opposite these barbed lugs 27 and 28 on the part 22 and are provided with barbed lugs 32 and 31 in the immediate vicinity of their outer edges.

A further strut 33 on the part 22 continues one wall of the groove 24. Two struts 34 and 35 on the part 23 are located opposite this strut 33 on the part 22. The struts 34 and 35 are of different heights and engage with the strut 33 when the parts are fitted together in such a manner as to produce a secure and rigid joint. A further strut 36 is formed on the outer wall of the groove 25 in the part 23 so that when the parts 22 and 23 are fitted together, the strut 36 abuts against the inner surface of the part 22 by means of its outer edge.

Another type of transverse reinforcement is shown in this embodiment and is constituted by inclined ribs 37 which are located opposite the lug 27 on the strut 26 and support the said strut against the surface of the part 22. A saw-toothed arrangement 38 is provided on one portion of the inner surface of the part 22 between the struts 26 and 33. FIGURE 2 illustrates how both parts 22 and 23 are connected and also shows how reinforcing inserts 39 are arranged in some of the spaces between the struts and grooves. These reinforcing inserts may be of metal, wood or any other material desired.

A board component as shown in FIGURE 3 is composed of two parts 40 and 41 which are shown also in FIGURE 6 in perspective. This component is again intended to form part of a drawer and is provided with a groove 25 for the base and a groove 24 for the guide strip, the groove 24 being located at mid-height. The part 41 is substantially identical with the part 2 shown in FIGURE 4, the sole difference being that the barbed lug 13 is located on the wall of the groove 25 while the strut 12 is located on the end wall of the groove 25, as is the strut 36 in FIGURE 5. It is clear that the part 1 with a smooth outer surface shown in FIGURE 4 may be fitted together with the part 41 to form a board component. The board component thus produced has a smooth outer wall and a groove 25 in which a base may be inserted. A board component of this type may be used inter alia for the rear or even for the front wall of a drawer, both of which must have smooth surfaces.

The part 40 is correspondingly provided with a center groove 24 for the guide strip and with two barbed struts 42 and 43 which match the barbed struts 14 and 15 of the part 1 shown in FIGURE 4. The struts 20 on the part 1 shown in FIGURE 4 match the side walls of the groove 24. The part 40 shown in FIGURE 6 is, like the part 1 shown in FIGURE 4, provided with saw-toothed arrangements 53 and 54. In a modification shown in FIGURE 6, the center portion of the part 40 has again been modified. Instead of the groove 24 for the rail for the drawer, there is provided a differently shaped groove 44. This groove 44 is provided with an inwardly directed projection 45 so as to produce a strip handle. This modified embodiment is preferably used as the end board of a drawer which is thus at the same time provided with a handle which no longer needs to be fitted separately. It is clear from the description of the last embodiment in particular that when the various parts which compose the boards are exchanged, it is possible to form all the sides of a drawer. A part 41 is always used and is combined either with part 40, 44 or 1.

Connecting members are used to attach the above-described board components to one another, these connecting members being in the form of tongue and groove joints, angle joints, or cross-joints and T-joints. These connecting members are also made of plastic material and are illustrated in a number of different embodiments in FIGURES 7 to 12. The connecting members essentially consist of an upright member which continues the board parts and is, therefore, of the same width, height and shape. Connecting pins are moulded on to this upright member of square cross-section.

Figure 7:
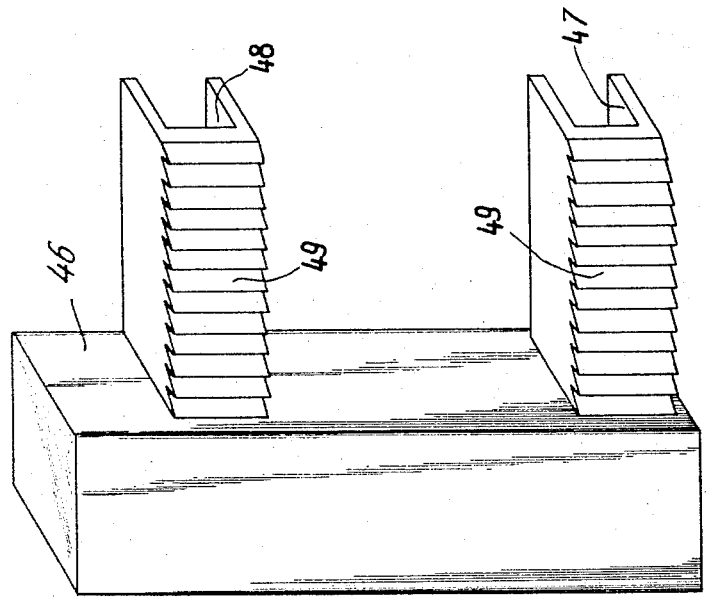

As shown in FIGURE 7, a connecting member comprises an upright member 46 of the same width and height as the board section shown in FIGURE 1, two pins 47 and 48 being moulded thereon and having a substantially U-shaped cross-section, the outside of the base surface being provided with a saw-toothed arrangement 49. Both pins 47 and 48 have outer dimensions which match the spaces in the board section between the struts 15 and 17 and 14 and the outer wall, as shown in FIGURE 1. The saw-toothed arrangements 49 engage with the corresponding saw-toothed portion on the part 1 shown in FIGURE 1 in the areas mentioned and produce a secure joint between the board component and connecting member.

Figure 8:
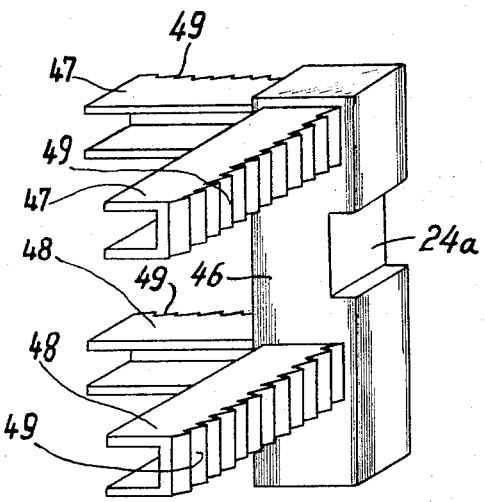

As shown in the embodiment in FIGURE 8, two sets of pins 47 and 48 are arranged at an angle to one another on the upright portion 46 of the connecting member. In this case too, each pin carries a saw-toothed arrangement 49 which is moulded thereon in such a manner as to engage in the corresponding saw-toothed portion in the board components to connect and hold them together.

Figure 9:
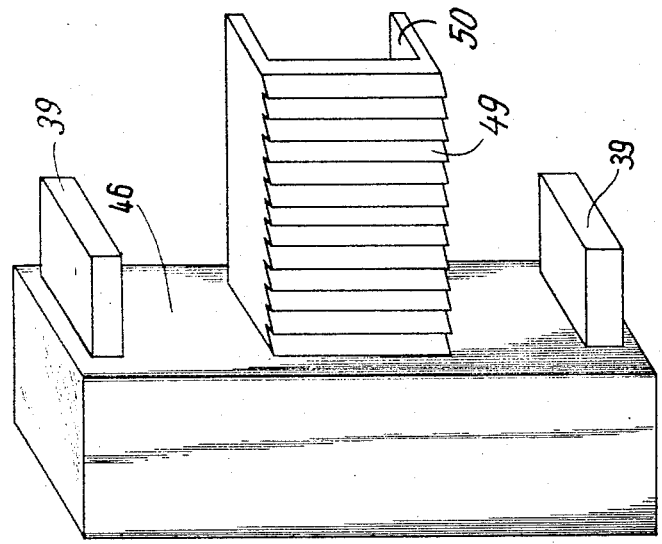

As shown in FIGURE 9, a connecting member comprises an upright member 46 of the same width and height as the board section shown in FIGURE 2, one pin 50 being moulded thereon and having a substantially U-shaped cross-section similar to that of pins 47 and 48 and being provided on the outside with a similar saw-toothed arrangement 49. In addition, this upright member 46 is provided with the reinforcing inserts 39 which are positioned inward from the upper and lower ends and sides of the member 46 to permit them to fit snugly into the end of a board of the embodiment of FIGURE 2 as shown in FIGURE 2. The inserts 39 are integral with the upright member 46 and extend horizontally, outward from the member and have sides parallel to the sides of the pin 50.

Figure 10:
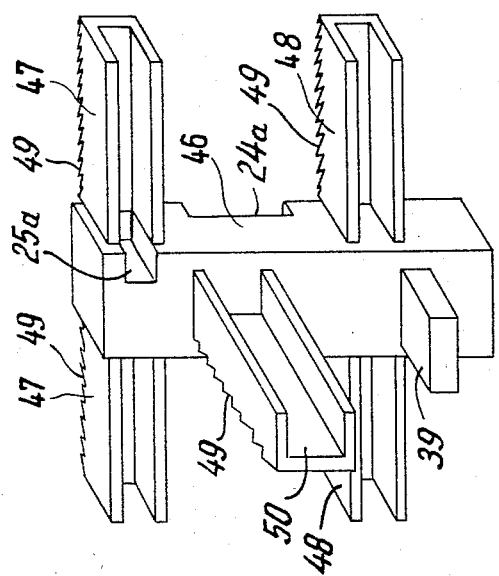

As shown in FIGURE 10, a connecting member is provided with pins which project out on three sides so as to connect three board components with one another, two of the boards being in alignment with each other while the third is at an angle thereto.

In FIGURE 10, a connecting member comprises an upright member 46 of the same width and height as the board sections shown in FIGURES 1, 2 and 3. Member 46 has moulded on two opposite sides two sets of pins 47 and 48 such as those shown in FIGURE 7 and on a third side one pin 50 as those shown in FIGURE 10 and a reinforcing insert 39. Each pin 47, 48 and 50 is provided with saw-toothed arrangements 49.

Figure 11:
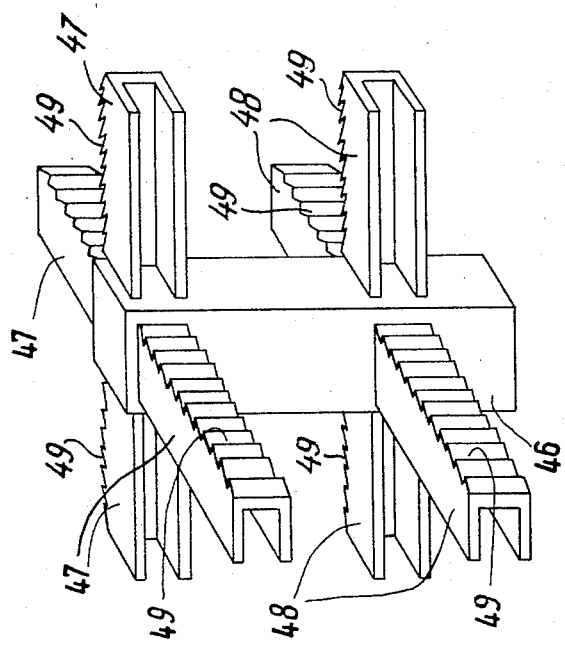

In a further embodiment shown in FIGURE 11, a connecting member 46 is provided with four sets of pins 47 and 48 extending in all four directions so as to produce a cross-joint, two boards which are in alignment with each other always being at an angle with respect to the other two.

Figure 12:
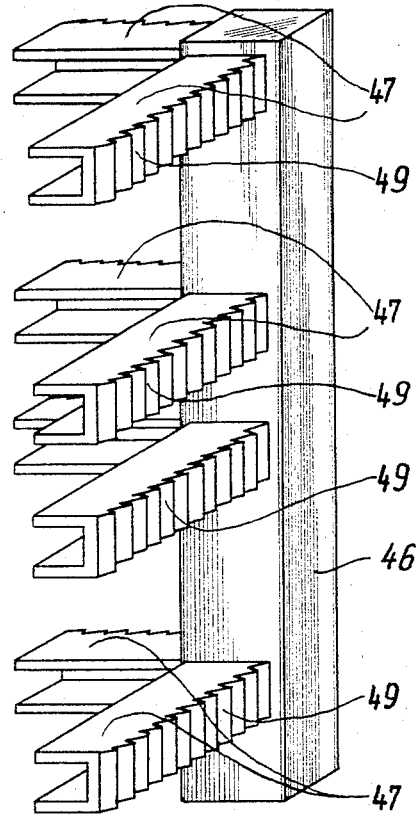

In yet another embodiment, as shown in FIGURE 12, a connecting member 46 is provided with four pairs of pins 47 positioned on two adjacent sides of the member. The pins are similar in all features to those of the pins 47 in the other figures, e.g. FIGURE 7. This embodiment is useful for making a double drawer, or side boards of greater height than that of an embodiment such as that of FIGURE 8.

In order to form drawers, the connecting members may, as is shown in FIGURE 8, be provided with grooves, e.g. 24a, which match the grooves 24 in the board components, the base of the drawer being inserted in the groove 24. Similarly grooves 24a and 25a corresponding to grooves 24 and 25 may be provided as shown in FIGURE 10 to hold the guide rail for the drawer.

It is clear from the above description that unit construction components according to the invention may be used to produce a wide range of box-shaped units as well as shelves and boxes with compartments. Not only is it possible to interchange matching board components but, since the boards are composed of two sections they may be adapted to the most varied uses and may constitute inter alia the side, front and rear walls of drawers. The height of the board components may be adapted to the use to which they are to be put and they may also be located one above the other. In the latter case, the connecting members are made several times as high as the board components which are then attached thereto in a stacked arrangement. When double-drawers are made in this way, a lower board component is composed of the parts 1, FIGURES 1 and 4, and 41, FIGURES 3 and 6, while an upper component is composed of parts 2, FIGURES 1 and 4, and 40, FIGURES 3 and 6.

The plastic material used to make the boards and connecting members may be any material which is suitable for injection moulding, including polyvinyl chloride, polyethylene, polypropylene, polytetrafluoroethylene, polytrifluorochloroethylene, and other synthetic resins well-known to the plastic materials moulding art and construction art. Polyvinyl chloride and its copolymers with other polyvinyl type resins is preferably used. However, other classes of plastics which can be used in injection moulding processes and which have the rigidity and stability necessary for use of as a structural material may be used.

I claim:

1. A unit construction component, comprising boards and connecting members, the boards being composed of two outwardly smooth-surfaced portions of injection-moulded material connected together by means of inwardly extending barbed members between which are located longitudinally-extending spaces, the connecting members, being provided with angularly related pins which engage in the longitudinal spaces in the boards and are secured by means of saw-toothed barbs.

2. A component as claimed in claim 1, wherein the boards are composed of a part which forms three longitudinal outer surfaces and a cover mounted on the first part and forming a longitudinal outer surface.

3. A component as claimed in claim 1, wherein the boards are provided with an insert groove adjacent one longitudinal edge.

4. A component as claimed in claim 2, wherein the boards are provided with a guide groove on the wall opposite the insert groove.

5. A component as claimed in claim 1, wherein transverse reinforcements are arranged on the barbed members on the boards.

6. A component as claimed in claim 1, wherein the longitudinal spaces in the boards contain reinforcements in the form of U-shaped rails.

7. A component as claimed in claim 1, wherein the connecting members form the end walls of the boards.

8. A component as claimed in claim 1, wherein the boards are provided on one of their outer longitudinal sides with transverse ribs which serve as supports for a pigeon-hole arrangement.

9. A component as claimed in claim 1, wherein the connecting members are several times the height of the boards.

10. A unit construction component, comprising a multiplicity of boards and connecting members, each board comprising two outwardly planar-surfaced portions of injection-moulded material, each portion comprising at least one pair of laterally and longitudinally extending barbed locking members integral with longitudinally extending strut members integral with an inwardly facing surface opposite its outwardly facing surface, a longitudinally extending surface located between said strut members, laterally extending saw-toothed barbed locking members integral with an inwardly facing surface of at least one portion and projecting into one of said spaces between at least one pair of strut members of said portion, each connecting member comprising an upright member bearing integral therewith and at an angle thereto at least one horizontally extending pin member having a multiplicity of saw-toothed barb members extending laterally from at least one surface of said pin member which pin member engages in the longitudinal spaces between said struts of said board and the connecting member thereby being secured by interlocking of said barb members on said pin member to said barb members on said inner surface of said portion of said board.

11. A component as claimed in claim 10, wherein each board comprises a first board part which forms three longitudinal outer surfaces substantially in the form of an inverted U having a top surface and two side surfaces and a second board part which extends from one side surface to the other side surface of the first board part and is parallel to said top surface, forming a fourth longitudinal surface and serving to cover said first board part.

12. A component as claimed in claim 11, wherein at least one board is provided with an insert groove in said top surface adjacent one of said side surfaces.

13. A component as claimed in claim 11, wherein at least one board is provided with a guide groove in one outer surface between said two side surfaces.

14. A component as claimed in claim 10, wherein transverse reinforcements are arranged on the longitudinal barbed members on the boards.

15. A component as claimed in claim 10, wherein the longitudinal spaces in the boards contain reinforcements in the form of U-shaped rails.

16. A component as claimed in claim 12, wherein boards provided with an insert groove in said top surface are provided with a guide groove in the opposite outer surface between said two side surfaces.

17. A component as claimed in claim 10, wherein the connecting members form the end walls of the boards, each connecting member having an upright member provided with the same outer surface cross sectional form as the board whose end wall it forms.

18. A component as claimed in claim 10, wherein at least one board is provided on one of its outer longitudinal sides with transverse ribs which serve as supports for a pigeonhole arrangement.

19. A component as claimed in claim 10, wherein the connecting members are several times the height of the boards.

20. A component as claimed in claim 11, wherein at least one board is provided in said cover surface with a groove having an inwardly directed projection.

21. A component as claimed in claim 10, wherein the connecting member is provided with angularly related pins.

22. A component as claimed in claim 10, wherein connecting members of one form are used in combination with connecting members of at least one other form in combination with said boards to form said component.

23. A component as claimed in claim 11, wherein at least one connecting member has at least one reinforcing insert integral with said upright member and extending horizontally outward from said member with sides of said insert parallel to sides of a pin on said member.

24. In a unit construction component comprising at least one connecting member and a board composed of two outwardly facing planar-surfaced portions of injection-moulded material interlocked by means of at least one internal locking means, one of said portions being a cover portion and the other portion being a reinforcement portion, a cover portion characterized by having:
an outwardly facing first planar surface and an inwardly facing second planar surface opposite said first surface,
at least one pair of longitudinally extending barbed strut members integral with said second planar surface,
longitudinally extending spaces between said strut members for receiving a connecting member and strut members of a compartment portion, and
a multiplicity of laterally extending sawtoothed barb members integral with said second planar surface and projecting from said surface, each barb on each said barbed strut member being positioned at a distance from said second planar surface such that the barb will interlock with a corresponding barb on a corresponding barbed strut member on said compartment portion of said component, and said multiplicity of laterally extending barbs being positioned to interlock with a connecting member inserted into said spaces when said cover portion is locked to a compartment portion.

25. A cover portion in accordance with claim 24 in which a portion of said cover includes a groove extending longitudinally.

26. In a unit construction component comprising at least one connecting member and a board composed of two outwardly facing planar-surfaced portion of injection-moulded material interlocked by means of at least one internal locking means, one of said portions being a cover portion and the other portion being a compartment portion, a compartment portion characterized by having:
an outwardly facing first planar surface and an inwardly facing second planar surface opposite said first surface,
at least one pair of longitudinally extending barbed strut members integral with said second planar surface,
at least one non-barbed longitudinally extending reinforcing strut member parallel to said strut members,
longitudinally extending side members integral with said second planar surface and together with said surface forming a compartment having open ends,
longitudinally extending spaces between said strut members for receiving a connecting member and strut members of a cover portion,
each barb on each said barbed strut members being positioned at a distance from said second planar surface such that the barb will interlock with a corresponding barb on a corresponding barbed strut member of said cover portion of said component.

27. A compartment portion in accordance with claim 26 in which a portion of said compartment includes a groove extending longitudinally.

28. A board composed of two outwardly facing planar-surfaced portions of injection-moulded material interlocked by means of at least one internal locking means, one of said portions being a cover portion and the other portion being a compartment portion, said cover portion having:
an outwardly facing first planar surface and an inwardly facing second planar surface opposite said first surface,
at least one pair of longitudinally extending barbed strut members integral with said second planar surface,
longitudinally extending spaces between said strut members to receive a connecting member and strut members of a connecting member, and a multiplicity of laterally extending saw-toothed barb members integral with said second planar surface and projecting from said surface, said compartment portion having:
an outwardly facing first planar surface and an inwardly facing second planar surface opposite said first surface,
at least one pair of longitudinally extending barbed strut members integral with said second planar surface,
at least one non-barbed longitudinally extending reinforcing strut member parallel to said barbed strut members,
longitudinally extending side members integral with said second planar surface and together with said surface forming a compartment bearing open ends, longitudinally extending spaces between said strut members for receiving a connecting member and strut members of said cover portion, the barbed strut members on said cover portion being positioned inward from the sides of said cover and the barbed strut members on said compartment portion being positioned inward from the sides of said compartment, said barbed strut members of the cover portion being positioned to interlock with said barbed strut members of the compartment portion, said members being interlocked.

References Cited

UNITED STATES PATENTS

| | | |
|---|---|---|
| 2,809,467 | 10/1957 | St. Pierre et al. _____ 46—26 X |
| 3,044,656 | 7/1962 | Combs et al. |
| 3,053,353 | 9/1962 | Miller _____ 52—220 X |
| 3,191,724 | 6/1965 | De Ridder _____ 52—570 |
| 3,282,635 | 11/1966 | Himelreich _____ 312—214 |

FOREIGN PATENTS

| | | |
|---|---|---|
| 1,345,888 | 11/1963 | France. |
| 898,610 | 6/1962 | Great Britain. |
| 1,021,239 | 3/1966 | Great Britain. |

ALFRED C. PERHAM, *Primary Examiner.*

U.S. Cl. X.R.

52—585, 615, 621, 630; 312—263, 349, 350